US012393946B2

(12) United States Patent
Jackson et al.

(10) Patent No.: US 12,393,946 B2
(45) Date of Patent: Aug. 19, 2025

(54) SYSTEM AND METHOD FOR AUTHENTICATION AND PAYMENT WHILE WEARING A FACE COVERING

(71) Applicant: Mastercard International Incorporated, Purchase, NY (US)

(72) Inventors: Sheldon Jackson, St. Louis, MO (US); Christopher T. Scholl, Florissant, MO (US); Aravind Mattaparthi, O'Fallon, MO (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 17/562,639

(22) Filed: Dec. 27, 2021

(65) Prior Publication Data
US 2023/0206238 A1   Jun. 29, 2023

(51) Int. Cl.
*G06Q 20/40* (2012.01)
*G06Q 20/32* (2012.01)
(Continued)

(52) U.S. Cl.
CPC ..... *G06Q 20/40145* (2013.01); *G06Q 20/321* (2020.05); *G06Q 20/3274* (2013.01);
(Continued)

(58) Field of Classification Search
CPC .......... G06Q 20/40145; G06Q 20/321; G06Q 20/3274; G06Q 20/3674; G06V 40/55; H04W 68/005
See application file for complete search history.

(56) References Cited

U.S. PATENT DOCUMENTS 7,277,017 B2 *  10/2007  Baba .................. G06K 19/0739
                                                             340/572.1
8,541,745 B2 *   9/2013  Dickinson .............. G04G 21/00
                                                                250/340
(Continued)

FOREIGN PATENT DOCUMENTS

WO        2021217139        10/2021

OTHER PUBLICATIONS

Method and Apparatus for Mobile Identity Authentication An IP.com Prior Art Database Technical Disclosure Authors et al.: Disclosed Anonymously IP.com No. IPCOM000194545D (Year: 2010).*

(Continued)

*Primary Examiner* — Calvin L Hewitt, II
*Assistant Examiner* — Steven R Chism
(74) *Attorney, Agent, or Firm* — Hovey Williams LLP

(57) ABSTRACT

The disclosure describes systems and methods for authenticating a consumer performing a digital wallet transaction while wearing a face covering. A consumer authentication system includes an electronic circuit device having a wireless transmitter chip associated with a unique identifier (UID). The system receives a transaction request message, and in response, transmits an authentication request message to the consumer. The system then receives an authentication response message from the consumer. The authentication response message includes a biometric sample of a select physical feature of the consumer. The system determines that the biometric sample matches the biometric profile of the consumer above a predetermined lower threshold and then reads a unique identifier (UID) from the electronic circuit device. The system determines whether the read unique identifier (UID) matches the unique identifier (UID) of the new consumer account.

11 Claims, 9 Drawing Sheets

(51) Int. Cl.
*G06Q 20/36* (2012.01)
*G06V 40/50* (2022.01)
*H04W 68/00* (2009.01)

(52) U.S. Cl.
CPC ......... *G06Q 20/3674* (2013.01); *G06V 40/55* (2022.01); *H04W 68/005* (2013.01)

(56) References Cited

U.S. PATENT DOCUMENTS

| | | | | |
|---|---|---|---|---|
| 10,269,222 | B2* | 4/2019 | Visitacion | G06F 3/011 |
| 11,151,542 | B2* | 10/2021 | Senguttuvan | G06F 21/32 |
| 11,178,139 | B1* | 11/2021 | Jones | H04L 63/0853 |
| 2014/0214670 | A1* | 7/2014 | McKenna | G06Q 20/4014 |
| | | | | 705/44 |
| 2016/0042346 | A1* | 2/2016 | Pastore | G06Q 20/40145 |
| | | | | 705/44 |
| 2018/0189788 | A1* | 7/2018 | Lacoss-Arnold | G06Q 20/3223 |
| 2019/0139051 | A1* | 5/2019 | Kopf | G06Q 20/204 |
| 2019/0199793 | A1* | 6/2019 | Sarin | H04L 63/126 |
| 2020/0372495 | A1* | 11/2020 | Maheshwari | G06Q 20/3678 |
| 2020/0402039 | A1* | 12/2020 | Storm | G06K 7/087 |
| 2021/0035109 | A1 | 2/2021 | Wong et al. | |
| 2021/0397213 | A1* | 12/2021 | Kariguddaiah | A61B 5/02438 |
| 2022/0147972 | A1* | 5/2022 | Dershem | G06Q 20/3278 |

OTHER PUBLICATIONS

A. E. Al-Chalabi, S. Essa, H. Shahzad and I. Damaj, "A wearable and ubiquitous NFC wallet," 2015 IEEE 28th Canadian Conference on Electrical and Computer Engineering (CCECE), Halifax, NS, Canada, 2015, pp. 152-157, doi: 10.1109/CCECE.2015.7129177. (Year: 2015).*

International Search Report and Written Opinion for PCT Application No. PCT/US2022/049202 (Dated Feb. 27, 2023).

* cited by examiner

SYSTEM AND METHOD FOR AUTHENTICATION AND PAYMENT WHILE WEARING A FACE COVERING

FIELD OF THE DISCLOSURE

The field of the disclosure relates generally to authenticating a consumer wearing a face covering during a digital wallet transaction and, more particularly, to a payment application that utilizes biological factors and wireless sensor technology to authenticate a transaction.

BACKGROUND OF THE DISCLOSURE

With a rise in infectious diseases and the rapid spread of novel viruses, many countries, states, counties, and cities implement face mask mandates. The face mask mandates are meant to facilitate reducing the spread of such diseases and viruses. However, many mobile devices use facial recognition technology to authenticate a user and perform various functions. For example, many digital wallet applications installed on such mobile devices require user authentication to perform contactless payment transactions. When a user is wearing a face mask, however, the facial recognition generally fails, which results in an unsuccessful transaction. To use the mobile device, the user is typically required to remove his or her face mask, or type in a PIN. Such actions defeat the purpose of contactless transactions and may leave the user exposed to such diseases and viruses.

BRIEF DESCRIPTION OF THE DISCLOSURE

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a consumer authentication system is provided. The consumer authentication system includes an electronic circuit device and a consumer authentication computing system. The electronic circuit device includes a wireless transmitter chip that has a unique identifier (UID) stored thereon. The electronic circuit device is configured to wirelessly transmit the unique identifier (UID). The consumer authentication computing system includes a memory device for storing data and a processor communicatively coupled to the memory device. The processor is configured to perform operations to receive account registration information from a consumer computing device associated with a consumer. The account registration information includes the unique identifier (UID). The processor is configured to generate a new consumer account. The new consumer account includes the account registration information and the unique identifier (UID). The processor is also configured to receive a biometric profile of the consumer. The biometric profile includes a digital representation of a select physical feature of the consumer. Furthermore, the processor is configured to store the new consumer account and the biometric profile on the memory device, and to receive, from the consumer computing device, a transaction request message including a transaction request. In response to the transaction request, the processor transmits an authentication request message to the consumer computing device. The processor is also configured to receive an authentication response message from the consumer computing device. The authentication response message includes a biometric sample of the select physical feature of the consumer. Moreover, the processor is configured to determine that the biometric sample matches the biometric profile of the consumer above a predetermined lower threshold. The processor reads the unique identifier (UID) from the electronic circuit device and determines whether the read unique identifier (UID) matches the unique identifier (UID) of the new consumer account.

In another aspect, a method is provided. The method includes receiving account registration information from a consumer computing device associated with a consumer. The account registration information includes a first unique identifier (UID). The method also includes generating a new consumer account. The new consumer account includes the account registration information and the first unique identifier (UID). The method also includes receiving a biometric profile of the consumer. The biometric profile includes a digital representation of a select physical feature of the consumer. Furthermore, the method includes storing the new consumer account and the biometric profile in a memory device of a consumer authentication computing system. The method includes receiving, from the consumer computing device, a transaction request message including a transaction request, and in response to the transaction request, transmitting an authentication request message to the consumer computing device. Moreover, the method includes receiving an authentication response message from the consumer computing device. The authentication response message includes a biometric sample of the select physical feature of the consumer. The method includes determining that the biometric sample matches the biometric profile of the consumer above a predetermined lower threshold and reading a second unique identifier (UID) from an electronic circuit device associated with the consumer. In addition, the method includes determining whether the second unique identifier (UID) matches the first unique identifier (UID).

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
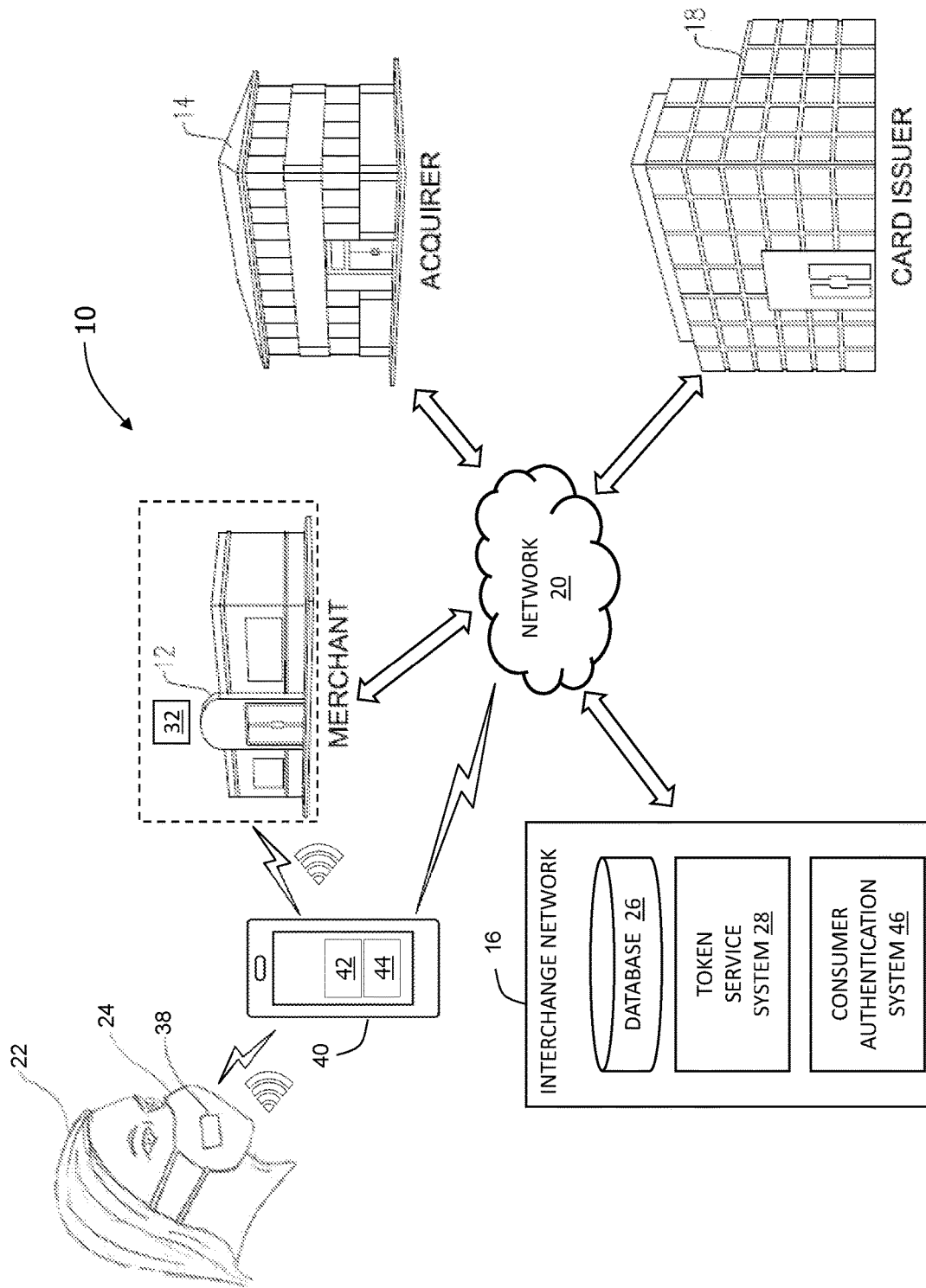
FIG. 1 is a block diagram of an example multi-party payment network system, in accordance with one embodiment of the present disclosure.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

As used herein, the term "database" includes either a body of data, a relational database management system (RDBMS), or both. As used herein, a database includes, for example, and without limitation, a collection of data including hierarchical databases, relational databases, flat file databases, object-relational databases, object oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL® (PostgreSQL is a registered trademark of PostgreSQL Community Association of Canada, Toronto, Canada). However, any database may be used that enables the systems and methods to operate as described herein.

As used herein, the terms "payment card," "transaction card," and "financial transaction card," may include any suitable transaction card, such as a credit card, a debit card, a charge card, a membership card, a promotional card, an identification card, a prepaid card, a gift card, and/or any other card-type device that may hold payment account information. Each type of transaction card can be used as a method of payment for performing a transaction.

Furthermore, as used herein, the term "real-time" includes at least one of the times of occurrence of the associated events, the time of collection of data, the time to process the data, and the time of a system response to the events and the environment. For the activities and the events in the embodiments described herein as occurring in real-time, it should be assumed that they occur substantially instantaneously.

Payment Network Systems

FIG. 1 is a block diagram of an example multi-party payment network system 10. The payment network system 10 facilitates providing interchange network services offered by an interchange network 16. In addition, the payment network system 10 enables contactless payment transactions, for example, by a consumer computing device 40. In the payment network system 10, merchants 12, acquirers 14, and/or issuers 18 do not need to have a one-to-one relationship. Although parts of the payment network system 10 are presented in one arrangement, other embodiments may include the same or different parts arranged otherwise, depending, for example, on authorization processes for purchase transactions, communication between computing devices, etc. As used herein, the term "interchange network" includes an electronic network that exchanges data relating to the value of card account sales and credits among the issuers 18 and the acquirers 14 (e.g., networks maintained, for example, by Mastercard©). (Mastercard is a registered trademark of Mastercard International Incorporated.)

In the exemplary embodiment, the consumer computing device 40 (e.g., a smartphone or other computing device used by the consumer 22) includes a user interface (not labelled) that facilitates user interaction with the respective consumer computing device 40. For example, and without limitation, the user interface enables the consumer 22 to input information to the consumer computing device 40, and the consumer computing device 40 to output information to the consumer 22 (e.g., on a display of the consumer computing device 40). The user interface includes, for example, a digital wallet application 42 (broadly, a digital wallet), which is installed on the consumer computing device 40. It is contemplated that fewer or more digital wallets may be installed on the consumer computing device 40 and displayed by the user interface, where each digital wallet is associated with at least one financial institution (not shown).

The consumer computing device 40 can be any computing device capable of interconnecting to the network 20, such as the Internet, including a mobile web-based device, smartphone, PDA, or other mobile web-based connectable equipment. The consumer computing device 40 is interconnected to the Internet through one or more interfaces including a network, such as a local area network (LAN) or a wide area network (WAN), dial-in-connections, cable modems, wireless modems, and special high-speed ISDN lines. In addition, in the example embodiment, the consumer computing device 40 is configured to communicate with other user computing devices and/or merchant point-of-sale (POS) systems 32 using various forms of communication including, for example, radio frequency communication, near field communication (NFC), network-based communication, and the like.

In the example embodiment, the payment network system 10 generally includes the merchants 12, the acquirers 14, the interchange network 16, and the issuers 18 coupled in communication via a network 20. The network 20 includes, for example and without limitation, one or more of a local area network (LAN), a wide area network (WAN) (e.g., the Internet, etc.), a mobile network, a virtual network, and/or any other suitable public and/or private network capable of facilitating communication among the merchants 12, the acquirers 14, the interchange network 16, and/or the issuers 18. In some embodiments, the network 20 may include more than one type of network, such as a private payment transaction network provided by the interchange network 16 to the acquirers 14 and/or the issuers 18, and, separately, the public Internet, which may facilitate communication between the merchants 12, the interchange network 16, the acquirers 14, and consumers 22, etc.

Embodiments described herein may relate to a transaction card system, such as a credit card payment system using the Mastercard interchange network. The Mastercard interchange network is a set of proprietary communications standards promulgated by Mastercard for the exchange of financial transaction data and the settlement of funds between financial institutions that are members of Mastercard. As used herein, financial transaction data includes a unique account number associated with an account holder using a payment card issued by an issuer, purchase data representing a purchase made by the consumer, including a type of merchant, amount of purchase, date of purchase, and other data, which may be transmitted between any parties of multi-party payment network system 10.

In a transaction card system as described herein, a financial institution called the "issuer" issues a payment card account (not shown) to a cardholder or consumer 22, who uses the payment card account to tender payment for a purchase from the merchant 12. In the example embodiment, the merchant 12 is typically associated with products, for example, and without limitation, goods and/or services, that are offered for sale and are sold to the consumers 22. The merchant 12 includes, for example, a physical location and/or a virtual location. A physical location includes, for example, a brick-and-mortar store, etc., and a virtual location includes, for example, an Internet-based store-front.

To accept payment with the payment card account, the merchant 12 must normally establish an account with a financial institution that is part of the payment network system 10. This financial institution is usually called the "merchant bank," the "acquiring bank," or the acquirer 14. When the consumer 22 provides payment for a purchase with the payment card account (e.g., via a payment card or digital wallet), the merchant 12 requests authorization from the acquirer 14 for the purchase amount. The request may be performed over the telephone but is usually performed using a point-of-sale (POS) terminal, such as the POS terminal 32, that wirelessly connects to the consumer computing device 40 and reads the consumer's payment account information, such as a payment token 44 (broadly, digital wallet data) tied to a primary account number (PAN), from a memory device of the consumer computing device 40 and communicates electronically with the transaction processing computers of the acquirer 14. Alternatively, the acquirer 14 may authorize a third party to perform transaction processing on its behalf. In this case, the POS terminal 32 will be configured to communicate with the third party. Such a third party is usually called a "merchant processor," an "acquiring processor," or a "third party processor."

Using the interchange network 16, computers of the acquirer 14 or merchant processor will communicate with computers of the issuer 18 to determine whether the consumer's account is in good standing and whether the purchase is covered by the consumer's available credit line. Based on these determinations, the request for authorization will be declined or accepted. If the request is accepted, an authorization code is issued to the merchant 12.

When a request for authorization is accepted, the available credit line of the consumer's account is decreased. Normally, a charge for a payment card transaction is not posted immediately to the consumer's account because bankcard associations, such as Mastercard, have promulgated rules that do not allow the merchant 12 to charge, or "capture," a transaction until the purchased goods are shipped or the purchased services are delivered. However, with respect to at least some debit card transactions, a charge may be posted at the time of the transaction. When the merchant 12 ships or delivers the goods or services, the merchant 12 captures the transaction by, for example, appropriate data entry procedures on the POS terminal 32. This may include bundling of approved transactions daily for standard retail purchases. If the consumer 22 cancels a transaction before it is captured, a "void" is generated. If the consumer 22 returns goods after the transaction has been captured, a "credit" is generated. The interchange network 16 and/or the issuer 18 stores the transaction data, such as, and without limitation, the PAN, a type of merchant, a merchant identifier, a location where the transaction was completed, an amount of purchase, a merchant category code, a date and time of the transaction, products purchased and related descriptions or identifiers, etc., in a transaction database 26.

After a purchase has been made, a clearing process occurs to transfer additional transaction data related to the purchase among the parties to the transaction, such as the acquirer 14, the interchange network 16, and the issuer 18. More specifically, during and/or after the clearing process, additional data, such as a time of purchase, a merchant name, a type of merchant, purchase information, consumer account information, a type of transaction, itinerary information, information regarding the purchased item and/or service, and/or other suitable information, is associated with a transaction and transmitted between the parties to the transaction as transaction data, and may be stored by any of the parties to the transaction.

After a transaction is authorized and cleared, the transaction is settled among the merchant 12, the acquirer 14, and the issuer 18. Settlement refers to the transfer of financial data or funds among the merchant 12, the acquirer 14, and the issuer 18 related to the transaction. Usually, transactions are captured and accumulated into a "batch," which is settled as a group. More specifically, a transaction is typically settled between the issuer 18 and the interchange network 16, and then between the interchange network 16 and the acquirer 14, and then between the acquirer 14 and the merchant 12. It should be appreciated that more or less information related to transactions, as part of either authorization, clearing, and/or settling, may be included in the transaction data and stored within the transaction database 26, at the merchant 12, the acquirer 14, the payment network 16, and/or the issuer 18. Further, transaction data, unrelated to a particular payment account, may be collected by a variety of techniques, and similarly stored within the transaction database 26.

In some embodiments, consumers 22 involved in the transactions described herein are prompted to agree to legal terms associated with their payment accounts, for example, during enrollment in such payment accounts, etc. As such, the consumer 22 may voluntarily agree to allow the merchants 12, the issuers 18, the interchange network 16, etc., to utilize data collected during enrollment and/or collected relating to processing the transactions, subsequently for one or more of the purposes described herein.

As described above, the payment token 44 and/or the consumer's PAN is passed from the consumer computing device 40 to the POS terminal 32. In many instances, the payment token 44 and/or the PAN and the associated expiry date may be saved to various databases, such as the database 26. Contactless digital wallet transactions are generally performed in EMV mode. Contactless EMV mode is more secure than traditional mag-stripe mode (e.g., for use with physical payment cards) and includes a unique cryptogram for the specific transaction. Digital wallet transactions initiated by the consumer computing device 40 at the POS terminal 32 typically include tokenized account data (such data including, for example, the PAN and the expiry date). As a result, the possibility of the actual PAN and expiry date of a payment card account to be exposed to fraudsters, for example, via a data breach, is substantially decreased.

Thus, referring back to FIG. 1, the interchange network 16 includes a token service system 28, which is configured to generate or assign one or more contactless payment tokens, such as payment token 44, to respective payment card accounts that are to be tokenized. Tokenization can be performed, for example, at the POS terminal 32, at a consumer computing device 40, a contactless ATM, and the like. The consumer computing device 40, for example, may include a banking application or digital wallet application 42 executing thereon to facilitate tokenizing the payment card account, storing the payment token 44, and/or performing a transaction with the payment token 44.

During a tokenization operation, for example, being performed at the consumer computing device 40, the PAN is sent to the card issuer 18 along with a request message to tokenize the PAN. In some embodiments, the card issuer 18 may evaluate risk associated with the token request message and perform other assessments and/or processing before approving and transmitting the token request message to the token service system 28. The token service system 28 generates or assigns a contactless payment token to the PAN to be tokenized and creates an association mapping between the contactless token and the PAN. The token service 28 stores the contactless token-to-PAN mapping data (e.g., in a data mapping table) in a database, such as the database 26. The token service system 28 transmits the payment token 44, for example, to the consumer computing device 40 such that the payment token 44 can be written to and stored on the consumer computing device 40. This process is generally the same whether being performed at a POS terminal 32, a contactless ATM, or any other suitable NFC enabled device.

The interchange network 16 also includes a consumer authentication computing system 46 that is configured to analyze various data associated with the consumer, such as biometric data and a unique identifier (UID), to authenticate a user of the consumer computing device 40 before performing a transaction. In particular, in the example embodiment, the consumer authentication computing system 46 is a specially programmed computer system that enables the interchange network 16 to implement an automated process to identify and authenticate the consumer 22 who may be wearing a face covering 24, and as such, who may be unable to be authenticated via a traditional facial recognition process. To facilitate the authentication process, the face covering 24 includes an electronic circuit device 38 configured to wirelessly transmit a unique identifier (UID), for example, to the consumer computing device 40.

In the example embodiment, the consumer authentication computing system 46 is programmed to communicate with one or more consumer computing devices, such as the consumer computing device 40, via digital wallet application 42, to receive account registration information (not shown in FIG. 1) to facilitate establishing an account that is not registered with the consumer authentication computing system 46. In particular, the account registration process creates a consumer account and associated credentials for use with the consumer authentication computing system 46 and/or the digital wallet application 42. The consumer 22 enters the account registration information for transmission to the consumer authentication computing system 46. The account registration information may include, for example, and without limitation, payment account data (e.g., the PAN, a virtual payment number, limited use number, etc.), identification data of the consumer computing device 40 (e.g., an Electronic Serial Number (ESN), Mobile Equipment Identifier (MEID), International Mobile Equipment Identity (IMEI) number, and the like), the unique identifier (UID) associated with the electronic circuit device 38, and/or biometric data of the consumer 22, as described herein. The account registration information may be stored in a database, such as the database 26. The consumer authentication computing system 46 generates a consumer account from the account registration information for the consumer 22.

To authenticate the consumer 22, in the example embodiment, the consumer authentication computing system 46 is programmed to receive a biometric profile (not shown in FIG. 1) from a database or biometrics module (not shown in FIG. 1). The consumer authentication computing system 46 is also programmed to receive the unique identifier (UID) associated with the electronic circuit device 38 from the consumer computing device 40. The biometric profile may include, for example, biometric data associated with the consumer 22, i.e., one or more scans or digital representations of select physical features of the consumer 22 that are to be validated during authentication requests for transactions via the digital wallet application 42. The biometric data or physical features of the consumer 22 can include, for example, and without limitation, facial features, iris features, vein patterns, and the like. The biometric profile may be stored, for example, in the biometrics module or the database 26. The consumer authentication computing system 46 supplements the consumer profile with the biometric profile. The biometrics module is programmed to receive the one or more scans or digital representations of physical features from the consumer computing device 40 and use the scans or digital representations to generate the biometric profile and/or validate the scans or digital representations against the biometric profile. Validation of the one or more scans or digital representations may include validating a portion of the one or more scans or digital representations and verifying that the unique identifier (UID) corresponds to the validated scans or digital representations, for example, in the consumer profile.

While only one merchant 12, acquirer 14, interchange network 16, and issuer 18 are shown in FIG. 1 (for ease of reference), it should be appreciated that a variety of other embodiments may include multiple ones of these parties in various combinations.

Figure 2:
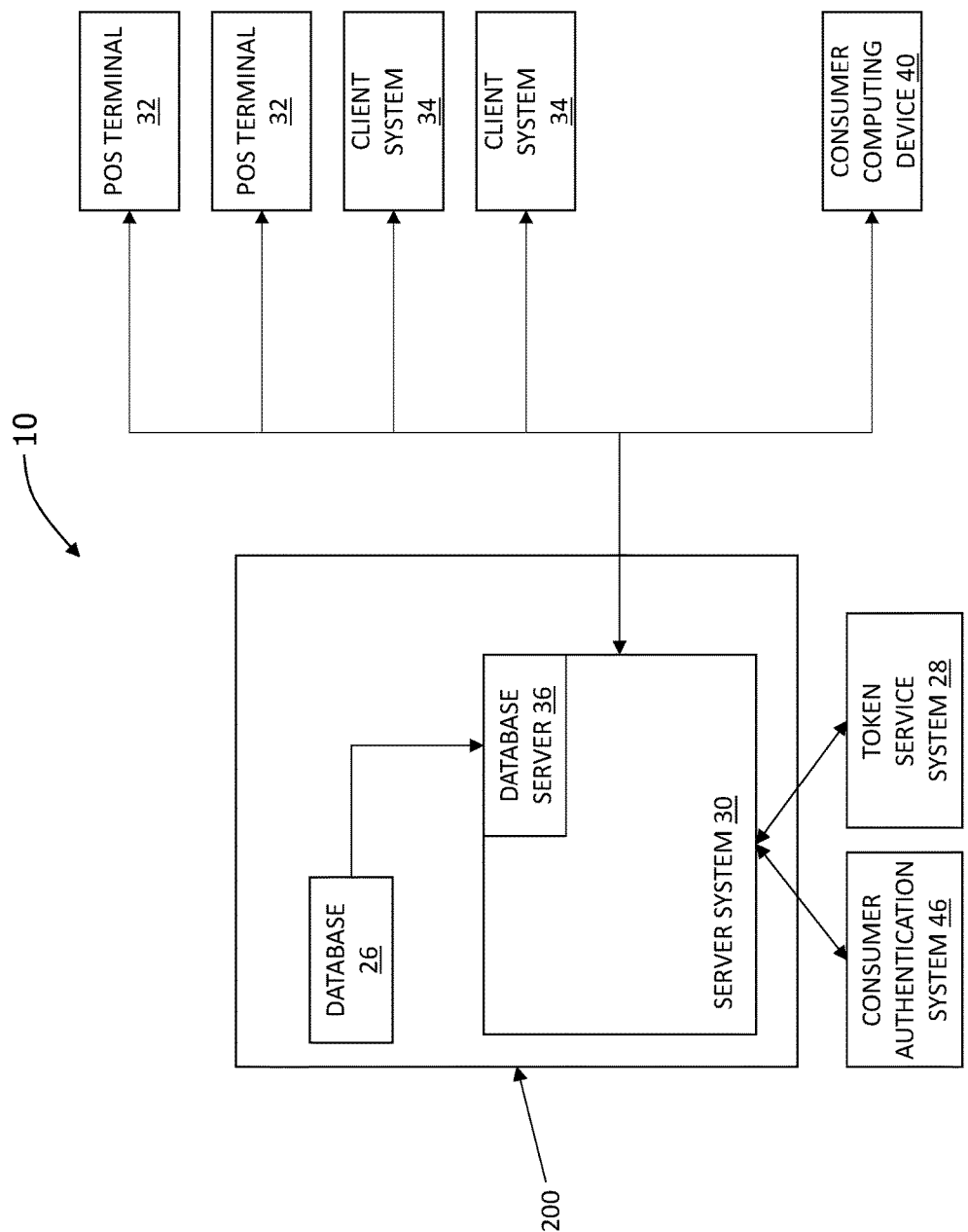
FIG. 2 is a simplified block diagram of an example payment network system, such as the payment network system shown in FIG. 1, including a plurality of computing devices and the consumer authentication computing system.

FIG. 2 is a simplified block diagram of an example payment network system, such as the payment network system 10, including a plurality of computing devices, the token service system 28, and the consumer authentication computing system 46. In the example embodiment, the plurality of computing devices include, for example, a processing system 200 having a server system 30, POS terminals 32 located at merchants, such as the merchant 12 (shown in FIG. 1), client systems 34 (e.g., contactless ATMs, computers, etc.) associated with merchants, merchant banks, payment networks, and/or issuer banks (e.g., the issuer 18 (shown in FIG. 1)), and the computing device 40 associated with the consumer 22 (shown in FIG. 1). In one embodiment, the payment network system 10 implements a process for authenticating the consumer 22 while the consumer is wearing the facial covering 24.

In the exemplary embodiment, as described above, the processing system 200 includes the server system 30 of, for example, the interchange network 16 (shown in FIG. 1), coupled in communication with the POS terminals 32, the client systems 34 (also includes client sub-systems), and the consumer computing device 40. In one embodiment, the client systems 34 and the consumer computing device 40 are computers that include a web browser, such that the server system 30 is accessible to the client systems 34 and the consumer computing device 40 using the Internet. The client systems 34 and the consumer computing device 40 are interconnected to the Internet through any one or more of many interfaces including, for example, a network, such as a LAN or WAN, dial-in-connections, cable modems, and/or special high-speed Integrated Services Digital Network (ISDN) lines. The client systems 34 and consumer computing device 40 could be any device capable of interconnecting to the Internet including an Internet connected phone, a PDA, or any other suitable web-based connectable equipment.

The POS terminals 32 may be connected to the client systems 34 or may be connected to the server system 30. The POS terminals 32 may be interconnected to the Internet (or any other network that allows the POS terminals 32 to communicate as described herein) through any one or more of many possible interfaces including a network, such as a local area network (LAN) or a wide area network (WAN), dial-in-connections, cable modems, wireless modems, and special high-speed ISDN lines. The POS terminals 32 are any device capable of interconnecting to the Internet and including an input device capable of reading information from a consumer's financial payment card. In some embodiments, the POS terminal 32 may be a consumer's personal computer, such as when conducting an online purchase through the Internet. As used herein, the terms POS device, POS terminal, and point of interaction device are used broadly, generally, and interchangeably to refer to any device with which the consumer 22 interacts to complete a digital wallet transaction.

A database server 36 is connected to the database 26, which is configured to store information on a variety of matters, including, for example, biometric data, consumer profiles/accounts, tokenization data corresponding to the consumer 22, identification data associated with the consumer computing device 40, and the like, as is described herein in greater detail. In one embodiment, the database 26 is a centralized database stored on the server system 30. The database 26 may be accessed by potential users at one of the client systems 34 by logging onto the server system 30 through one of the client systems 34. In an alternative embodiment, the database 26 is stored remotely from the server system 30 and may be a distributed or non-centralized database.

In one example embodiment, the database 26 may include a single database having separated sections or partitions or may include multiple databases, each being separate from each other. The database 26 may store transaction data generated as part of sales activities conducted over the processing network, including data relating to merchants, account holders or customers, issuers, acquirers, savings amounts, savings account information, and/or purchases made. The database 26 may also store account data including at least one of a consumer name, a consumer address, an account number, and other account identifiers that relate the consumer computing device 40 to the consumer 22. The database 26 may also store merchant data including a merchant identifier that identifies each merchant registered to use the network, and instructions for authenticating consumers and performing and settling transactions, including merchant bank account information. The database 26 may also store authorization request data and tokenization request data.

In the exemplary embodiment, one of the client systems 34 may be associated with the acquirer 14 (shown in FIG. 1) while another one of the client systems 34 may be associated with the issuer 18 (shown in FIG. 1). The POS terminal 32 may be associated with the merchant 12 (shown in FIG. 1) or may be a computer system and/or mobile computing system used by a cardholder (e.g., the consumer 22 (shown in FIG. 1)) making an on-line purchase or payment. The server system 30 may be associated with the interchange network 16 or another payment processor. In the example embodiment, the server system 30 is associated with a financial transaction processing network, such as the interchange network 16, and may be referred to as an interchange computer system. The server system 30 may be used for processing tokenization and transaction data. In addition, the client systems 34 and the POS terminals 32 may include a computer system associated with at least one of a merchant, an online bank, a bill payment outsourcer, an acquirer bank, an acquirer processor, an issuer bank associated with a payment card, an issuer processor, a remote payment processing system, a third-party aggregator, and/or a biller.

In the example embodiment, the processing system 200 is in communication with the consumer authentication computing system 46, which may be associated with the interchange network 16 or with an outside third party in a contractual relationship with the interchange network 16. In some embodiments, the consumer authentication computing system 46 is in communication with the server system 30 and may be a component of the server system 30 or a separate computing device. In the example embodiment, the consumer authentication computing system 46 processes transaction requests and authenticates a consumer based on biometric data and a unique identifier (UID) associated with a facial covering 24 of the consumer. As such, the consumer authentication computing system 46 is configured to receive/provide various data from/to one or more parties involved in the authentication request. It is noted that the payment network 10 may include more, fewer, or alternative components and/or perform more, fewer, or alternative actions, including those discussed elsewhere herein.

Furthermore, in an example embodiment, the processing system 200 is in communication with the token service system 28, which may be associated with the interchange network 16 or with an outside third party in a contractual relationship with the interchange network 16. In some embodiments, the token service system 28 is in communication with the server system 30 and may be a component of the server system 30 or a separate computing device. In the example embodiment, the token service system 28 processes tokenization requests and assigns payment tokens, such as the payment token 44 (shown in FIG. 1) to contactless payment devices, such as the consumer computing device 40, and as such, is configured to provide various transaction information to one or more parties involved in the tokenization request, such as the card issuer 18 and the consumer 22. It is noted that the payment network 10 may include more, fewer, or alternative components and/or perform more, fewer, or alternative actions, including those discussed elsewhere herein.

Face Covering

Figure 3:
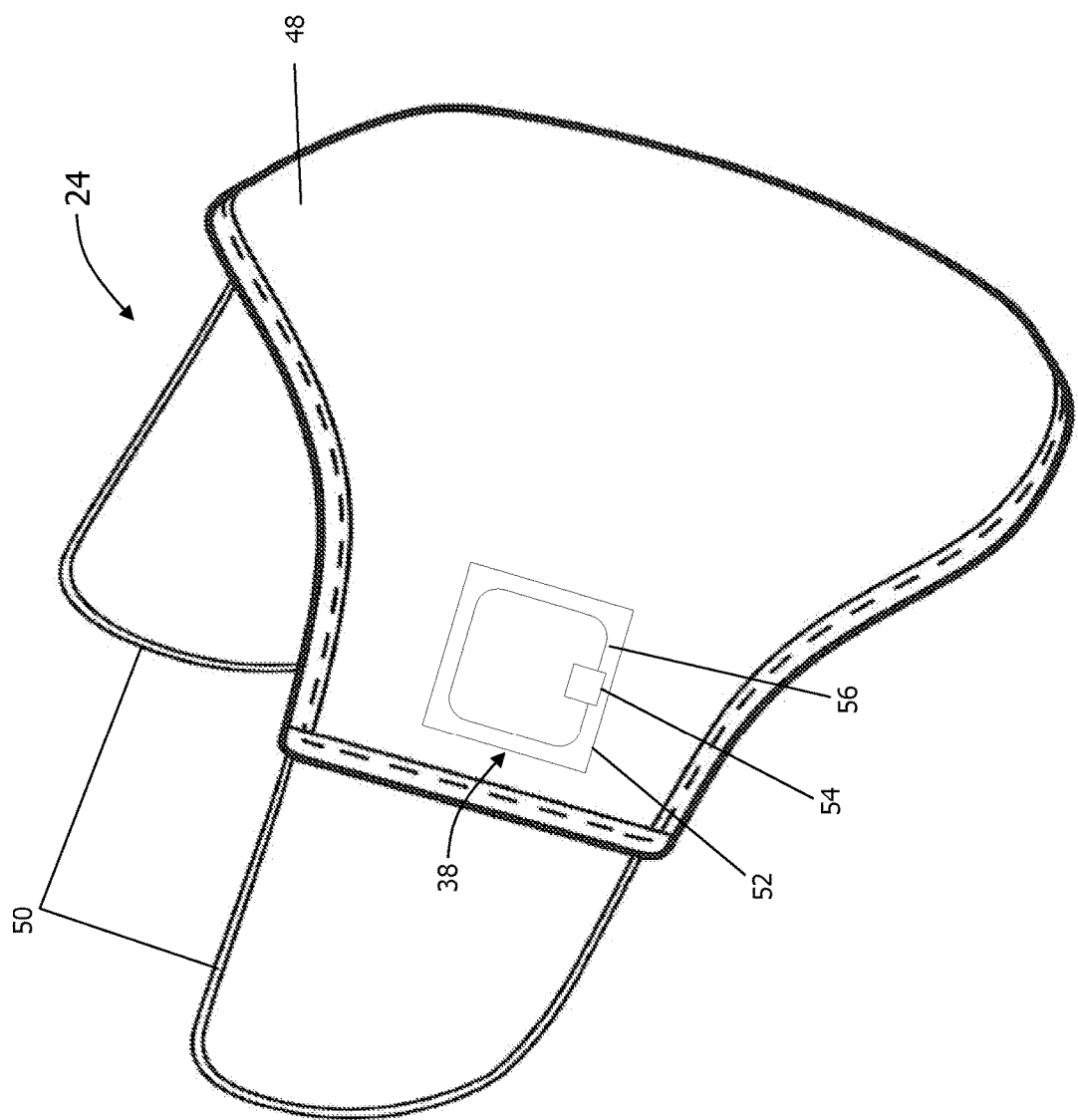
FIG. 3 is a schematic perspective view of the face covering for use in the payment network system shown in FIG. 1.

FIG. 3 is a schematic perspective view of the face covering 24. In the exemplary embodiment, the face covering 24 includes an integrated circuit (IC) or micromodule, such as the electronic circuit device 38, that stores and transmits data between electronic devices. In the exemplary embodiment, the electronic circuit device 38 is a wireless communication module that includes, for example, one or more of a Bluetooth, NRC, RFID, infra-red Wireless, Induction Wireless, WLAN, or Ultra-Wideband transmitter or transceiver. Preferably, the electronic circuit device 38 is configured to wirelessly communicate with the consumer computing device 40, for example, to transmit a unique identifier (UID) thereto.

The face covering 24 can include any type of face covering, such as, without limitation, a basic cloth mask, a disposable mask, a surgical mask, an N95 or KN95 respirator, a gaiter, and the like. In the example embodiment, the face covering 24 is depicted as a typical disposable surgical mask. The face covering 24 includes a central body portion 48 that is preferably of generally elliptical shape instead of rectangular form to provide a convenient and comfortable form fitting mask. The generally elliptical form facilitates fitting a user's face such that the face covering 24 substantially covers the user's nose and mouth. The example face covering 24 also includes a pair of elastic loops 50 for convenient application about the user's ears, which results in the face covering 24 being readily applied or removed as desired.

In the example embodiment, the electronic circuit device 38 is removably attached to the face covering 24. For example, and without limitation, the electronic circuit device 38 may be placed in a pocket formed on the face covering 24. This allows the electronic circuit device 38 to be removed from the face covering 24 such that the electronic circuit device 38 can be used with disposable and/or washable face coverings. Furthermore, removing the electronic circuit device 38 facilitates replacing a power source (e.g., a battery) of the electronic circuit device 38. In some embodiments, the electronic circuit device 38 may take the form of a sticker that may be adhered to the face covering 24, for example, if there is no pocket available for securing the electronic circuit device 38.

As depicted in FIG. 3, the electronic circuit device 38 includes a body 52 that may be generally planar and rectangular in shape. The body 52 may be formed of one or more layers of material, such as plastic sheet, paper, and the like. The one or more layers of material may be rigid or flexible. In some embodiments, an adhesive layer (not shown) may be provided on a surface of the body 52. A wireless transmitter chip 54 (e.g., an integrated circuit or IC) is embedded in the body 52. An antenna 56 is embedded in the body 52 and extends generally along a periphery of the body 52 to generally form a loop. The antenna 56 is coupled to the wireless transmitter chip 54 and is configured to transmit radio signals when current flows through the looped wire. For example, the antenna 56 allows the wireless transmitter chip 54 to transmit a unique identifier (UID), code, and/or electronic message (broadly "data"), stored in the wireless transmitter chip 54, to another electronic device, such as the consumer computing device 40. Moreover, the electronic circuit device 38 optionally includes an internal power supply (e.g., a battery or other self-contained power source) to provide power to the wireless transmitter chip 54.

For purposes of illustration, the wireless transmitter chip 54 and antenna 56 are depicted in FIG. 3, but in practical examples of the electronic circuit device 38 the body 52 may be formed largely of opaque plastic and/or paper and the wireless transmitter chip 54 and antenna 56 may be embedded in the opaque plastic and/or paper so as not to be visible.

Exemplary Computer Systems

Figure 4:
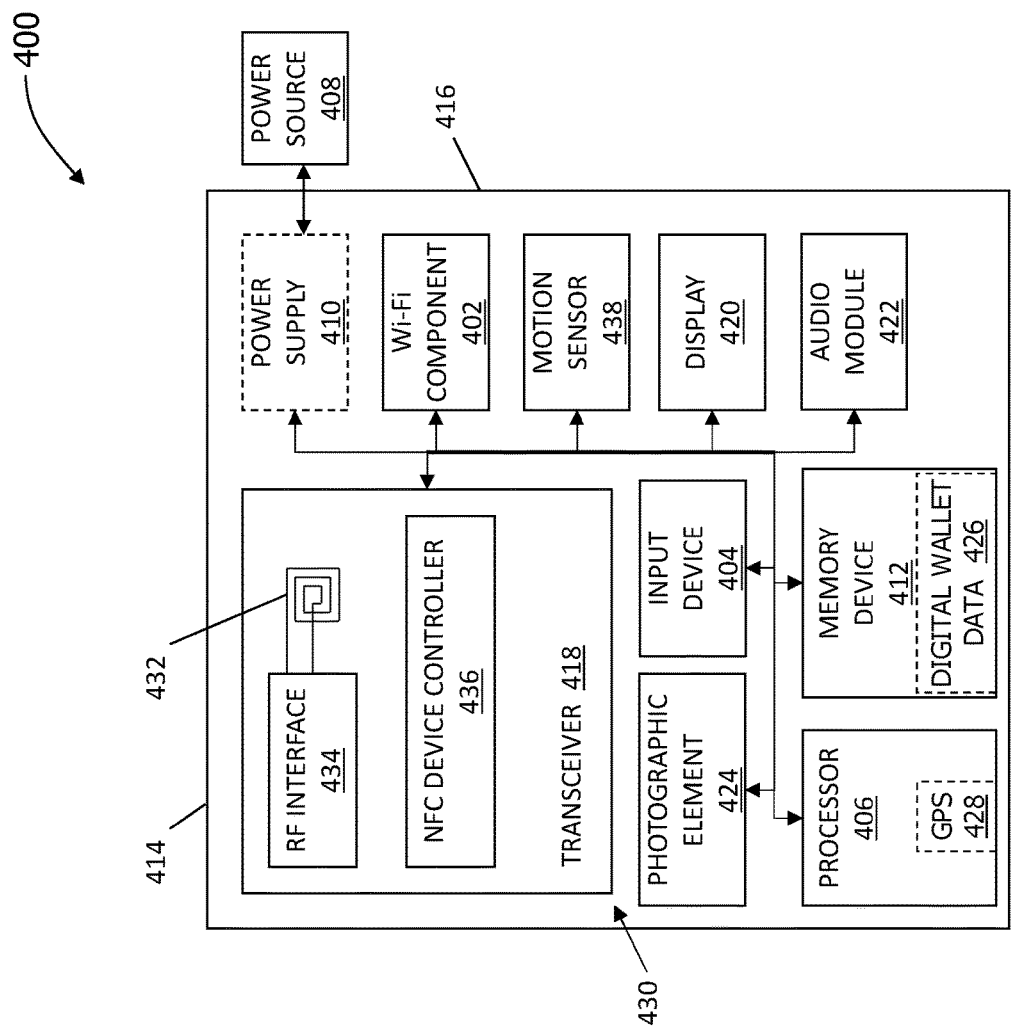
FIG. 4 is an example configuration of a user computing system for use in the payment network system shown in FIG. 1.

FIG. 4 is an example configuration of a user computing system 400, such as the consumer computing device 40 (shown in FIG. 1), that may be operated by a user, such as the consumer 22 (shown in FIG. 1). In the exemplary embodiment, the computing system 400 is a computing device configured to connect to one or more of the merchant 12, the interchange network 16, the issuer 18, the network 20, a POS terminal 32, the electronic circuit device 38, and any other computing devices, such as other consumer computing devices (not shown).

In the exemplary embodiment, the computing system 400 generally includes a processor 406, a memory device 412, a transceiver 418 (or a wireless communication device), and a photographic element 424. In addition, the computing system 400 includes an integrated Wi-Fi component 402 (e.g., implementing the Institute of Electrical and Electronics/IEEE 802.11 family of standards), an input device 404, a display 420, and an audio module 422. Moreover, the computing system 400 optionally includes an internal power supply 410 (e.g., a battery or other self-contained power source) to receive power, or alternatively, in some embodiments, the computing system 400 may include an external power source 408. Optionally, the computing system 400 may include a motion sensor 438.

The processor 406 includes one or more processing units (e.g., in a multi-core configuration) specially programmed for executing computer readable instructions. The instructions may be executed within a variety of different operating systems (OS) on the consumer computing device 40, such as UNIX, LINUX, Microsoft Windows®, etc. More specifically, the instructions may cause various data manipulations on data stored in the memory device 412 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.). The memory device 412 is any device allowing information such as digital wallet data 426, the executable instructions, and/or written works to be stored and retrieved. The memory device 412 includes one or more computer readable media.

In the example embodiment, the processor 406 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the computing system 400 may be widely deployed, it may be impractical to manually update software for each computing system 400. Therefore, the network system 100 provides a mechanism for automatically updating the software on the computing system 400. For example, an updating mechanism may be used to automatically update any number of components and their drivers, both network and non-network components, including system level (OS) software components. In some embodiments, the computing system 400 components are dynamically loadable and unloadable; thus, they may be replaced in operation without having to reboot the OS.

A location of the computing system 400 can be obtained through conventional methods, such as a location service (e.g., global positioning system (GPS) service) in the computing system 400, "ping" data that includes geotemporal data, from cell location register information held by a telecommunications provider to which the computing system 400 is connected, and the like. For example, in one suitable embodiment, an optional GPS chip 428 can be part of or separate from the processor 406 to enable the location of the computing system 400 to be determined.

Stored in the memory device 412 are, for example, computer readable instructions for providing a user interface to the user via the display 420 and, optionally, receiving and processing input from the input device 404. A user interface may include, among other possibilities, a web browser and the digital wallet application 42 (shown in FIG. 1). Web browsers enable users, such as the consumer 22, to display and interact with media and other information typically embedded on a web page or a website. The digital wallet application 42 allows the consumer 22 to interact, for example, with a POS terminal 32 and/or the merchant 12 to perform electronic transactions.

The photographic element 424 may include a camera or other optical sensor and lens combination capable of generating a video signal and capturing an image, iris scan, and the like. In various embodiments, the photographic element 424 may be integrated in a housing or body, such as a housing 414, of the computing system 400. When the photographic element 424 captures an image or otherwise generates image data (e.g., video data), the photographic element 424 may store the image data in a data file, either in a raw or compressed format, in the memory device 412.

In some embodiments, the motion sensor 438 may include one or more sensor elements that facilitate detecting a person's presence. For example, if the computing system 400 is operating as the consumer computing device 40, the motion sensor 438 detects when the consumer 22 moves or raises the consumer computing device 40. Upon detection of such motion, the photographic element 424 may begin capturing images (e.g., still or video images), the transceiver 418 may be activated, and/or the audio module 422 may begin capturing audio. The motion sensor 438 may be operatively coupled to the photographic element 424 such that the consumer's presence may be detected by detecting motion using the photographic element 424. The motion sensor 438 may include, for example, and without limitation, sensor elements such as a passive infrared sensor, an ambient light sensor, and the like.

In the example embodiment, the display 420 can include, for example, and without limitation, a liquid crystal display (LCD), an organic light emitting diode (OLED) display, or an "electronic ink" display. In some embodiments, a single component such as a touch screen may function as both an output device (e.g., the display 420) and the input device 404. As such, the display 420 may optionally include a touch controller for support of touch capability. In such embodiments, the computing system 400 may detect a user's presence by detecting that the user has touched the display 420 of the computing system 400.

The audio module 422 may include, for example, and without limitation, a speaker and related components capable of broadcasting streaming and/or recorded audio and may also include a microphone. The microphone facilitates capturing audio through the computing system 400.

In the example embodiment, the computing system 400 includes the housing 414 at least partly (and more preferably, at least substantially or entirely) enclosing the components described above. In addition, the computing system 400 includes circuitry 430 configured to communicate with the network 20 (shown in FIG. 1) and/or other computing devices (e.g., other user computing devices, the POS terminal 32, the interchange network 16, etc.). The circuitry 430 may include, for example, leads, connectors, NFC-enabled circuitry, Wi-Fi-enabled circuitry, and photographic element circuitry. The housing 414 is preferably configured to seal the circuitry 430, which is susceptible to degradation from the ambient environment. In one embodiment, the circuitry 430 is hermetically sealed in the housing 414. For example, in one embodiment, the circuitry 430 is completely and permanently encased within the housing 414. In other words, the housing 414 and the circuitry 430 are intended to remain as a single, inseparable unit throughout the life of the consumer computing device 40. It is understood that the housing 414 can be formed separately from the circuitry 430 and that the circuitry 430 can be placed into and sealed within the housing 414 in a separate operation. It is also understood that the housing 414 can be oversized with respect to the circuitry 430 so that the circuitry 430 can be placed loosely into the housing 414. In another embodiment, the circuitry 430 can be selectively, sealingly enclosed within the housing 414, where the housing 414 includes a closure 416 removably attached to a body of the housing 414.

The housing 414 is fabricated from a suitably selected material that facilitates inhibiting the effect the material has on the signal being emitted from, for example, the transceiver 418 and/or the Wi-Fi component 402 and passing through the housing material. For example, and without limitation, suitable materials from which the housing 414 may be fabricated include polyethylene, propylene, isoprene, and butylenes (i.e., polyolefins). In other embodiments, the housing 414 is fabricated from any material that enables the computing system 400 to function as described herein, such as metals, etc.

In one embodiment, the transceiver 418 includes an antenna 432. The antenna 432 includes a looped wire configured to transmit radio signals when current flows through the looped wire. The antenna 432 is any size, shape, and configuration that is suitable for transmitting signals as described herein. For example, the antenna 432 is a tuned circuit configured to transmit radio signals in any radio-based communication system including, but not limited to, Radio Frequency Identification (RFID), Wireless Local Area Network (WLAN), and Wireless Personal Area Network (WPAN) systems. In the example embodiment, the antenna 432 generates a magnetic field when it vibrates at a selected frequency. Specifically, the antenna 432 is configured to vibrate at a frequency of about 13.56 MHz, which is suitable for use in a near field communication (NFC) system.

In the example embodiment, the antenna 432 transmits radio signals to and receives radio signals from other wireless-enabled computing devices, for example, another user computing device, merchant POS terminals 32, the electronic circuit device 38, and/or any other components used in wireless systems. In NFC systems, for example, at least one NFC component generates a magnetic field to inductively transfer currents and, thereby, exchange signals and information with other NFC components positioned within the magnetic field. In one example embodiment, the antenna 432 functions as an NFC component to send and receive signals. The antenna 432 is configured to transmit radio signals to NFC components positioned within the magnetic field of the antenna 432, such as when the consumer computing device 40 is located within a predetermined distance of the electronic circuit device 38. Therefore, the magnetic field generated by the antenna 432 defines the active range of the computing system 400. Additionally, the antenna 432 receives radio signals from NFC components when the antenna 432 is positioned within the magnetic field of the NFC components.

The transceiver 418 also includes a radio frequency (RF) interface 434 and an NFC device controller 436. The RF interface 434 and the NFC device controller 436 are powered by the power source 408, and in some embodiments, the internal power supply 410. In addition, the processor 406 and the memory device 412 are powered in the same manner. The RF interface 434 is configured to receive and transmit RF signals through the antenna 432. The NFC device controller 436 is configured to process the received RF signals and to generate signals to be transmitted by the RF interface 434. The memory device 412 is configured to store data associated with transmitting and receiving the RF signals. The NFC device controller 436 is coupled in communication with the processor 406.

In some embodiments, the computing system 400 may be connected to one or more peripheral devices (not shown). That is, the computing system 400 may communicate various data with one or more peripheral devices. For example, the computing system 400 may communicate with one or more peripheral devices through the Wi-Fi component 402, the transceiver 418, or other suitable means.

Figure 5:
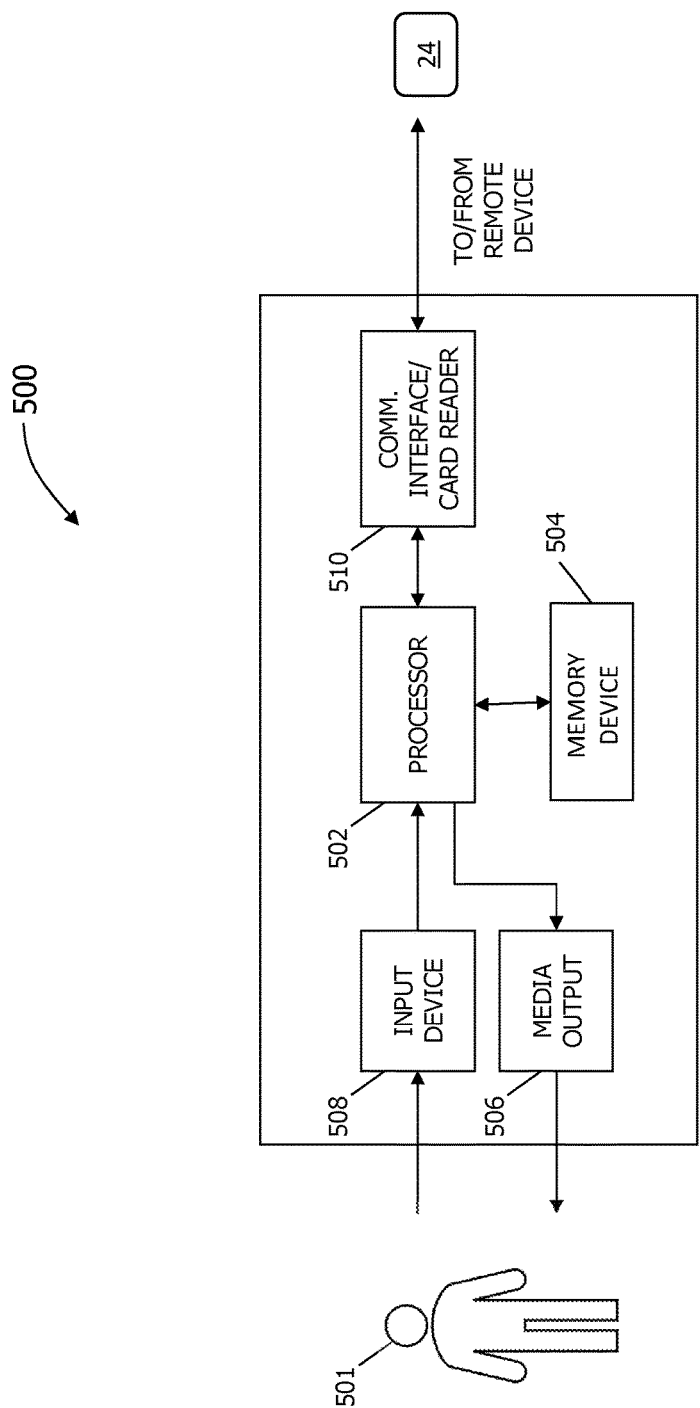
FIG. 5 is an example configuration of a computing system for use in the payment network system shown in FIG. 1.

FIG. 5 is an example configuration of a computing system 500 operated by a user 501. In some embodiments, the computing system 500 is a merchant POS terminal 32, a client system 34, and/or a contactless ATM, for example. In the example embodiment, the computing system 500 includes a processor 502 for executing instructions. In some embodiments, executable instructions are stored in a memory device 504. The processor 502 includes one or more processing units, for example in a multi-core processor configuration. The memory device 504 is any device allowing information such as executable instructions and/or written works to be stored and retrieved. The memory device 504 includes one or more computer readable media.

In the example embodiment, the processor 502 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the computing system 500 may be widely deployed, it may be impractical to manually update software for each computing system 500. Therefore, the system 10 may, in some embodiments, provide a mechanism for automatically updating the software on the computing system 500. For example, an updating mechanism may be used to automatically update any number of components and their drivers, both network and non-network components, including system level (OS) software components. In some embodiments, the computing system 500 components are dynamically loadable and unloadable; thus, they may be replaced in operation without having to reboot the OS.

The computing system 500 also includes at least one media output component 506 for presenting information to the user 501. The media output component 506 is any component capable of conveying information to the user 501. In some embodiments, the media output component 506 includes an output adapter such as a video adapter and/or an audio adapter. An output adapter is operatively coupled to the processor 502 and operatively connectable to an output device such as a display device, for example, and without limitation, a liquid crystal display (LCD), organic light emitting diode (OLED) display, or "electronic ink" display, or an audio output device such as a speaker or headphones.

In some embodiments, the computing system 500 includes an input device 508 for receiving input from the user 501. The input device 508 may include, for example, one or more of a touch sensitive panel, a touch pad, a touch screen, a stylus, a position detector, a keyboard, a pointing device, a mouse, and an audio input device. A single component such as a touch screen may function as both an output device of the media output component 506 and the input device 508.

The computing system 500 may also include a communication interface 510, which is communicatively connectable to a remote device such as the server system 30 (shown in FIG. 2), the consumer computing device 40, and/or the face covering 24. The communication interface 510 may include, for example, a wired or wireless network adapter or a wireless data transceiver for use with Bluetooth communication, radio frequency (RF) communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 504 are, for example, computer readable instructions for providing a user interface to the user 501 via the media output component 506 and, optionally, receiving and processing input from the input device 508. A user interface may include, among other possibilities, a web browser and a client application. Web browsers enable users, such as the user 501, to display and interact with media and other information typically embedded on a web page or a website from the server system 30. A client application allows the user 501 to interact with a server application associated with a merchant.

Figure 6:
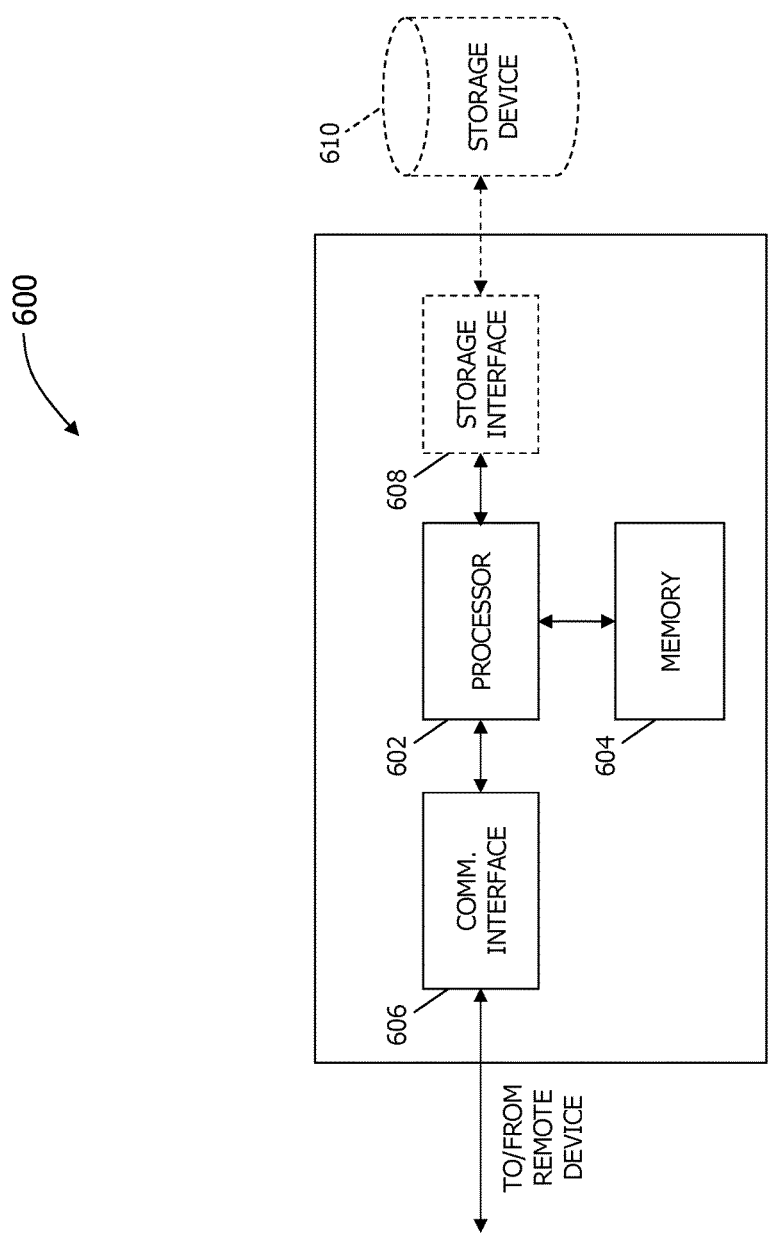
FIG. 6 is an example configuration of a server system for use in the payment network system shown in FIG. 1.

FIG. 6 is an example configuration of a server system 600, such as the server system 30 (shown in FIG. 2). The server system 600 includes, but is not limited to, the transaction database 26 (shown in FIG. 1), the token service system 28 (shown in FIG. 1), and the consumer authentication computing system 46 (shown in FIG. 1). In the example embodiment, the server system 600 includes a processor 602 for executing instructions. The instructions may be stored in a memory area 604, for example. The processor 602 includes one or more processing units (e.g., in a multi-core configuration) for executing the instructions. The instructions may be executed within a variety of different operating systems on the server system 600, such as UNIX, LINUX, Microsoft Windows®, etc. More specifically, the instructions may cause various data manipulations on data stored in a storage device 610 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.). In the example embodiment, the processor 602 may be implemented as one or more cryptographic processors, as described above with respect to the user system 600.

The processor 602 is operatively coupled to a communication interface 606 such that the server system 600 can communicate with a remote device such as a computing system 500 (shown in FIG. 5) or another server system. For example, the communication interface 606 may receive communications from a POS terminal 32, a client system 34, and/or a consumer computing device 40 via the Internet, as illustrated in FIG. 2.

The processor 602 is operatively coupled to the storage device 610. The storage device 610 is any computer-operated hardware suitable for storing and/or retrieving data. In some embodiments, the storage device 610 is integrated in the server system 600. In other embodiments, the storage device 610 is external to the server system 600 and is similar to the transaction database 26. For example, the server system 600 may include one or more hard disk drives as the storage device 610. In other embodiments, the storage device 610 is external to the server system 600 and may be accessed by a plurality of server systems 600. For example, the storage device 610 may include multiple storage units such as hard disks or solid-state disks in a redundant array of inexpensive disks (RAID) configuration. The storage device 610 may include a storage area network (SAN) and/or a network attached storage (NAS) system.

In some embodiments, the processor 602 is operatively coupled to the storage device 610 via a storage interface 608. The storage interface 608 is any component capable of providing the processor 602 with access to the storage device 610. The storage interface 608 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 602 with access to the storage device 610.

The memory area 604 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

Consumer Authentication System

Figure 7:
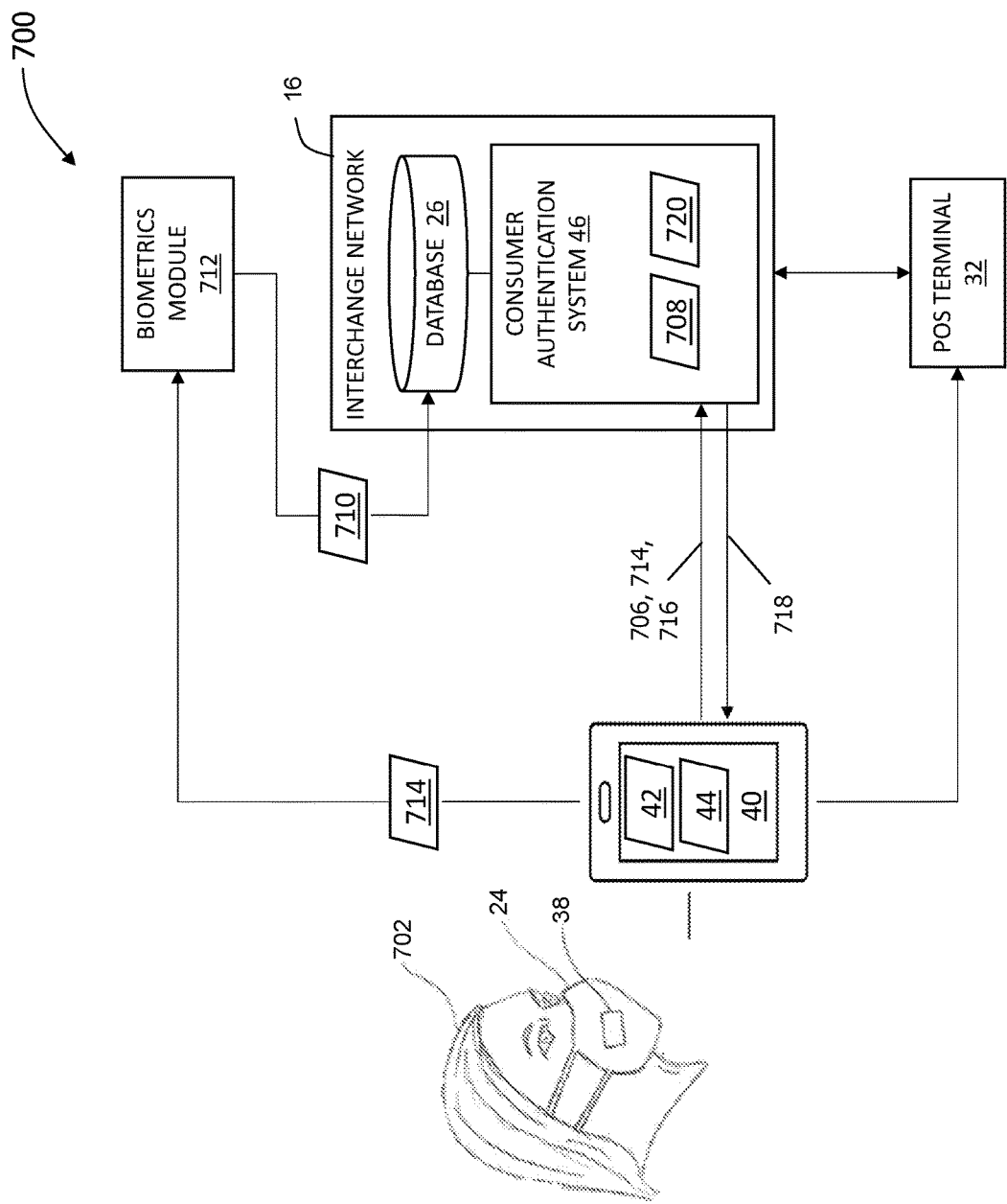
FIG. 7 is a schematic diagram showing operation of the consumer authentication system.

FIG. 7 is a schematic diagram showing operation of a consumer authentication system 700. As described herein, the consumer authentication computing system 46 is configured to receive requests from a consumer 702 to prevent processing of transactions against the consumer's PAN 720 without first obtaining real-time authentication of the consumer. In some embodiments, the consumer authentication computing system 46 is also in communication with a merchant system, an issuer system, and/or the POS terminal 32 of the merchant 12. In the example embodiment, the consumer authentication computing system 46 is a component of a payment card network, such as payment card interchange network 16.

In the example embodiment, the consumer authentication computing system 46 is programmed to communicate with one or more consumer computing devices 40, via the digital wallet application 42, to receive account registration information 706 to facilitate establishing a consumer account that is not previously registered with the consumer authentication computing system 46. In particular, the account registration process creates a consumer account and associated credentials for use with the consumer authentication computing system 46 and/or the digital wallet application 42. In the exemplary embodiment, the consumer 702 enters the account registration information 706 for transmission to the consumer authentication computing system 46. The account registration information 706 may include, for example, and without limitation, payment account data (e.g., the PAN, a virtual payment number, limited use number, etc.), identification data of the consumer computing device 40 (e.g., an Electronic Serial Number (ESN), Mobile Equipment Identifier (MEID), International Mobile Equipment Identity (EVIEI) number, and the like), biometric data of the consumer 702, and/or contact information, as described herein. The account registration information 706 may be linked and stored in the database 26. The consumer authentication computing system 46 generates a consumer profile (or account) 708 from the account registration information 706 for the consumer 702.

Furthermore, in the example embodiment, the consumer authentication computing system 46 is programmed to receive a biometric profile 710 from a biometrics module 712. The biometric profile 710 may include, for example, biometric data or biometrics of the consumer 702, i.e., one or more scans or digital representations 714 of select physical features of the consumer 702 that are to be validated during account setup and/or authentication requests for transactions against the consumer's PAN 720. As described herein, the biometrics or physical features of the consumer 702 can include, for example, and without limitation, facial features, iris features, vein patterns, and the like. The biometric profile 710 may be stored, for example, in the biometrics module 712 or the database 26. The consumer authentication computing system 46 supplements the consumer account 708 with the biometric profile 710. The biometrics module 712 is programmed to receive the one or more scans or digital representations 714 of physical features from the consumer's computing device 40 and use the scans or digital representations to generate the biometric profile 710 and/or validate one or more scans or digital representations 714 against the biometric profile 710. For example, the consumer authentication computing system 46, using the biometrics module 712, is configured to search a plurality of biometric identifiers for at least a partial match to the received biometric data. This partial match (e.g., using facial recognition processes) enables a user to be at least partly identified without a need to remove a face covering, such as the face covering 24. The consumer authentication computing system 46 determines whether to approve or deny the transaction based, at least in part on, on whether or not a match or partial match is found.

In the example embodiment, the consumer authentication computing system 46 is also programmed to receive the unique identifier (UID) 716, wirelessly, from the electronic circuit device 38 attached to the face covering 24 (shown in FIG. 1) and/or from the consumer 702 as part of the registration information. The unique identifier (UID) 716 facilitates authenticating the consumer 702 when the biometric data (i.e., the one or more scans or digital representations 714) indicates a potential match (e.g., a partial match), but the matching data falls below a predetermined upper threshold amount but above a predetermined lower threshold amount (i.e., within a predetermined threshold range). The consumer authentication computing system 46 supplements the consumer account 708 with the unique identifier (UID) 716.

In the exemplary embodiment, the consumer authentication computing system 46 communicates with the digital wallet application 42 to send, receive, and store information related to, for example, and without limitation, authentication of transactions against the consumer's PAN 720, notifications 718 of transactions made against the consumer's PAN 720, etc. When a consumer selects to perform a transaction, for example, with the consumer's PAN 720, at a POS terminal 32, the transaction is not allowed to proceed until the customer is authenticated. The digital wallet application 42 may require biometric data of the consumer to be validated before executing a transaction with the payment token 44.

In some embodiments, the consumer authentication computing system 46 may send notifications 718 to the consumer 702, for example, via the digital wallet application 42. The notifications 718 may concern transaction attempts made against the consumer's PAN 720. In the exemplary embodiment, the notifications 718 include information about the attempted transaction, including, for example, and without limitation, the merchant's name, the merchant's location, the transaction amount, combinations thereof, or other information. The notification may also include an authentication request message asking the consumer 702 to provide authentication of the transaction or to decline the transaction. For example, the digital wallet application 42 may request that the consumer 702 provide, for example, one or more scans or digital representations 714 of physical features of the consumer 702, such as facial or iris scans, to the consumer authentication computing system 46 via the consumer computing device 40 to facilitate authentication of the consumer for processing the transaction.

Exemplary Computer-Implemented Methods

Figure 8A:
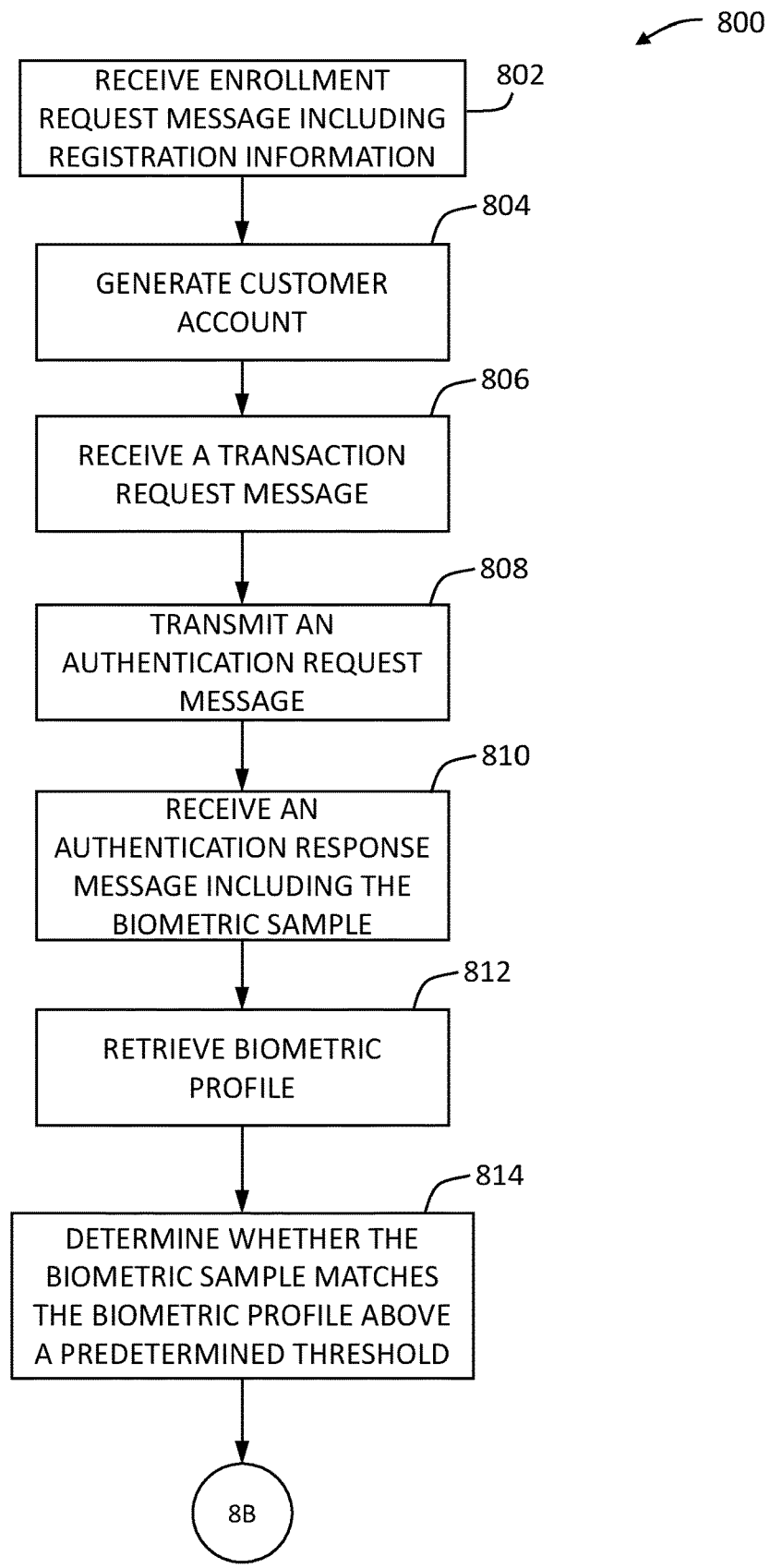
FIGS. 8A and 8B cooperatively depict a flow diagram of an exemplary computer-implemented method for registering and authenticating a consumer during a transaction using a consumer computing device, in accordance with one embodiment of the present disclosure.
Figure 8B:
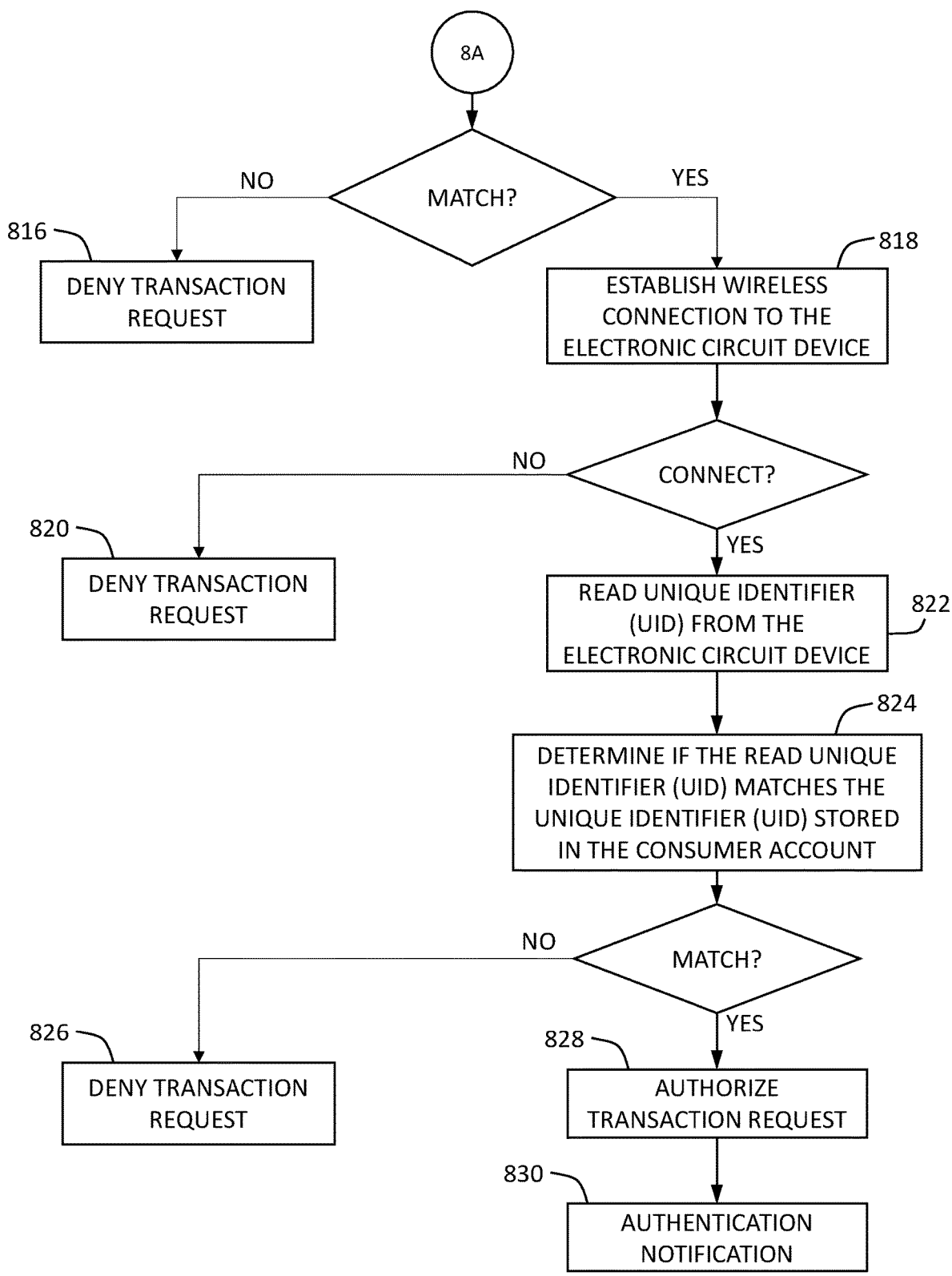

FIGS. 8A and 8B depict a flow diagram of an example method 800 for registering and authenticating a consumer 702 (such as the consumer 22 shown in FIG. 1), for example, during a transaction using the consumer computing device 40, in accordance with one embodiment of the present disclosure. The operations described herein may be performed in the order shown in FIGS. 8A and 8B or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 800 is described below, for ease of reference, as being executed by exemplary devices and components introduced with the embodiments illustrated in FIGS. 1-7. In one embodiment, the computer-implemented method 800 is implemented by the consumer authentication computing system 46 (shown in FIG. 1). In the exemplary embodiment, the computer-implemented method 800 relates to authenticating a consumer performing a contactless transaction using partial facial recognition and a unique identifier (UID) attached to a face covering. While operations within the computer-implemented method 800 are described below regarding the consumer authentication computing system 46, according to some aspects of the present invention, the computer-implemented method 800 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

In the exemplary embodiment, the method 800 includes the consumer authentication computing system 46 receiving, at operation 802, an enrollment request message including registration information from the consumer 702 (shown in FIG. 7). The registration information includes at least non-biometric identification information (e.g., a name, an address, a national identification number, etc.) and contact information (e.g., a mobile telephone number, an e-mail address, a social media account username, etc.). Further, the consumer authentication computing system 46 prompts, via a push notification, the consumer 702 to input biometric information (i.e., the one or more scans or digital representations 714 of physical features of the consumer) captured by the consumer computing device 40, and more particularly, the photographic element of the consumer computing device 40 (e.g., the photographic element 424). The consumer computing device 40 transmits the captured one or more scans or digital representations 714 to the consumer authentication computing system 46, which receives the information along with the enrollment request. In response to receiving the enrollment request and the registration information, at operation 804 the consumer authentication computing system 46 generates the consumer account 708 (shown in FIG. 7) for the requesting consumer on the database 26, for example. The consumer authentication computing system 46 enrolls the consumer 702 for future transactions.

During a digital wallet transaction by the consumer 702, at operation 806 the consumer authentication computing system 46 receives a transaction request message from the consumer 702. For example, the consumer 702 transmits a transaction request message to the consumer authentication computing system 46 from the consumer computing device 40 via the digital wallet application 42 running thereon. In response, at operation 808, the consumer authentication computing system 46 transmits (e.g., via push notification to the digital wallet application 42) an authentication request message to the consumer computing device 40. The authentication request message causes the digital wallet application 42 running on the consumer computing device 40 to display a notification that the authentication request message is received and to prompt or instruct the consumer 702 to enter or capture one or more scans or digital representations 714 of physical features of the consumer (i.e., biometric identification information or biometric sample). The one or more scans or digital representations 714 are transmitted to the biometrics module 712 of the consumer authentication computing system 46. In the exemplary embodiment, the biometric sample includes image data of the consumer's face for use in a facial recognition process. In certain embodiments, the biometric sample may include iris scans, vein pattern data, and/or any other digital representation of a biometric feature of the consumer that enables the consumer authentication computing system 46 to function as described herein.

At operation 810, the consumer authentication computing system 46 receives an authentication response message including the biometric sample, i.e., the captured one or more scans or digital representations 714, from the consumer computing device 40. At operation 812, the consumer authentication computing system 46 retrieves the biometric profile 710 (i.e., sample biometric information) corresponding to the consumer 702 from the database 26 and/or the biometrics module 712. In some embodiments, the database 26 may be a database maintained by a government or government agency that includes identity information forming a portion of a national identification system. For example, the identification database may a database including identification information such as name, address, biometric information (e.g., a facial and/or iris scan), telephone number, a national identification number, and/or other identifying information. In some embodiments, the consumer authentication computing system 46 retrieves the biometric profile 710 by making a call to the database 26. For example, in one embodiment, the consumer authentication computing system 46 makes a web services call using an Extensible Markup Language Remote Procedure Call (XML-RPC). In a web services call, the consumer authentication computing system 46 includes identification information of the consumer 702 such as a name, address, government issued identification number (e.g., a social security number), the captured one or more scans or digital representations 714, and/or other information. The database 26 and/or biometrics module 712 handling the web service call uses the identification information to identify a corresponding biometric profile 710 stored in the database 26 or biometrics module 712.

At operation 814, the consumer authentication computing system 46 compares the biometric profile 710 to the one or more scans or digital representations 714 and determines if there is a match (e.g., a match percentage) above a predetermined lower threshold. For example, the consumer authentication computing system 46 uses pattern-based algorithms or other image processing algorithms to compare an image associated with the captured one or more scans or digital representations 714 (e.g., representations of a face and/or iris) to an image associated with the biometric profile 710 (e.g., data associated with a face and/or iris). The comparison may yield a match percentage, other indicator of the degree to which the one or more scans or digital representations 714 matches the biometric profile 710, or a probability that the biometric profile 710 and the captured one or more scans or digital representations 714 match. Based on this information, the consumer authentication computing system 46 determines if there is a match between the sample and captured biometric information above a predetermined lower threshold value. As described herein, the consumer 702 may be wearing a face covering 24. Thus, the captured one or more scans or digital representations 714 of the consumer 702 may match above a predetermined lower threshold value but may fall short of authenticating the consumer 702 (e.g., being above a predetermined upper threshold value).

In response to a determination that there is not a match above the predetermined lower threshold value, the consumer authentication computing system 46 denies the transaction request at operation 816. The consumer authentication computing system 46 may also transmit a notification to the consumer 702, via the consumer computing device 40, indicating that the transaction request has been denied. For example, the consumer authentication computing system 46 transmits an instruction to the consumer computing device 40 that causes the digital wallet application 42 running thereon to display the notification.

In response to a determination that the match is above the predetermined lower threshold value and below the predetermined upper threshold value, the consumer authentication computing system 46 attempts to establish a wireless connection to the electronic circuit device 38 attached to the face covering 24 at operation 818. If the connection cannot be established, the consumer authentication computing system 46 denies the transaction request at operation 820. Upon a successful connection, the consumer authentication computing system 46 reads, or otherwise receives, the unique identifier (UID) 716 from the electronic circuit device 38 at operation 822.

At operation 824, the consumer authentication computing system 46 compares the received unique identifier (UID) 716 to the consumer account 708 and determines if the received unique identifier (UID) 716 matches the unique identifier (UID) stored in the consumer account 708. In particular, the consumer authentication computing system 46 retrieves the unique identifier (UID) stored in the consumer account 708 and compares it to the received unique identifier (UID) 716. In response to a determination that there is not a match, the consumer authentication computing system 46 denies the transaction request at operation 826. The consumer authentication computing system 46 may also transmit a notification to the consumer 702, as described above.

In response to a determination that there is a match, the consumer authentication computing system 46 authorizes the transaction request at operation 828. The consumer authentication computing system 46 authorizes transaction requests by, for example, allowing the digital wallet application to transmit the payment token 44 to the merchant POS terminal 32 for processing the transaction with the interchange network 16.

In some embodiments, the consumer authentication computing system 46 transmits a notification of authentication to the consumer 702 at operation 830. For example, the consumer authentication computing system 46 transmits an instruction to the consumer computing device 40 that is formatted to cause the digital wallet application 42 running thereon to display a notification. The notification may indicate that the consumer has been authenticated via facial/iris recognition and the unique identifier (UID) 716 by consumer authentication computing system 46 such that the transaction can been processed by the merchant.

In certain embodiments, the consumer authentication computing system 46 may receive a geolocation from the GPS chip 428 of the consumer computing device to identify locations that may have implemented mask mandates. In such instances, the consumer authentication computing system 46 may present an alert notification to the consumer 702, for example, via push notification to the consumer computing device 40 indicating that a mask mandate is in place in the consumer's current location. If the consumer resides or is otherwise located in an area affected by the mask mandate, the alert may be triggered automatically.

As described herein, mask mandates make it difficult to perform payment transactions using digital wallets stored on devices that use facial recognition to authenticate a user. Thus, to perform such digital wallet transactions, a user needs to remove their face mask or input a code, such as a user PIN. Entering a code or PIN can be difficult in situations where a consumer has one or more items in theirs hands. Further, there is a health risk to users that may remove their face mask to allow the device to perform traditional facial recognition. Advantages of the consumer authentication system described herein include authenticating a consumer using partial facial recognition along with a unique identifier that may be received by the consumer's computing device. The unique identifier is associated with the consumer and may be transmitted to the consumer's computing device via wireless technology. A circuit device having the unique identifier stored thereon may be attached, for example, to the face mask of the consumer. As such, the authentication system described herein allows wireless digital wallet transactions without the removal of a consumer's face mask.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

1. A system comprising:
 a consumer computing device associated with a consumer;
 a face covering of the consumer, the face covering including:
  a central body portion providing a form fitting mask covering a nose and mouth of the consumer;
  a pair of elastic loops attached to the central body portion; and
  an integrated electronic circuit device, separate from the consumer computing device, removably attached to the central body portion, and comprising a body being substantially formed of an opaque material, the body including an antenna and a wireless transmitter chip embedded into the opaque material, the antenna extending along a periphery of the body forming a loop, the wireless transmitter chip having a unique identifier (UID) stored thereon, the UID being associated with the electronic circuit device; and
 a consumer authentication computing system comprising:
  a processor; and
  a memory storing computer-executable instructions thereon, that when executed by the processor, cause the processor to perform operations of:
   receiving account registration information from the consumer computing device associated with the consumer, the account registration information including the unique identifier (UID);
   generating a consumer account including the account registration information and the unique identifier (UID);
   receiving a biometric profile of the consumer, the biometric profile including a digital representation of a physical feature of the consumer;
   storing the generated consumer account and the biometric profile on the memory;
   receiving, from the consumer computing device, a transaction request message including a transaction request;
   in response to the transaction request, transmitting an authentication request message to the consumer computing device;
   receiving an authentication response message from the consumer computing device, the authentication response message including a biometric sample;
   determining that the biometric sample matches the biometric profile of the consumer above a predetermined lower threshold value and below a predetermined upper threshold value;
   in response to the determination, establishing a wireless connection to the integrated electronic circuit device;
   reading, via the wireless connection, the unique identifier (UID) from the electronic circuit device; and
   approving the transaction request if the read unique identifier (UID) matches the unique identifier (UID) of the generated consumer account.

2. The system of claim 1, wherein said operation of receiving account registration information comprises receiving an enrollment request message from the consumer computing device.

3. The system of with claim 1, the computer-executable instructions, that when executed by the processor, further cause the processor to perform the operation of prompting, via a push notification, the consumer to input the biometric profile via the consumer computing device.

4. The system of with claim 1, wherein transmitting the authentication request message to the consumer computing device, further comprises pushing the authentication request message to a digital wallet application on the consumer computing device.

5. The system of with claim 4, said authentication request message comprising an instruction requesting the consumer enter the biometric sample into the consumer computing device.

6. The system of claim 1, the computer-executable instructions, that when executed by the processor, further cause the processor to perform operations of:

determining the read unique identifier (UID) matches the unique identifier (UID) of the generated consumer account based on comparing the biometric sample to the biometric profile; and determining a match percentage for the comparison.

7. The system in accordance with claim 1, the computer-executable instructions, that when executed by the processor, further cause the processor to perform the operation of, in response to the determination, determining that a wireless connection cannot be established to the electronic circuit device.

8. The system in accordance with claim 7, the computer-executable instructions, that when executed by the processor, further cause the processor to perform the operation of denying the transaction request based on the determination that a wireless connection cannot be established.

9. The system in accordance with claim 1, wherein determining that the read unique identifier (UID) matches the unique identifier (UID) of the generated consumer account comprises:

retrieving the unique identifier (UID) included in the generated consumer account; and comparing the read unique identifier (UID) to the retrieved unique identifier (UID) stored in the generated consumer account.

10. The system in accordance with claim 9, the computer-executable instructions, that when executed by the processor, further cause the processor to perform the operation of:

denying the transaction request, if the read unique identifier (UID) and the retrieved unique identifier (UID) do not match.

11. The system in accordance with claim 1, the face covering comprising one or more of the following: a cloth mask, a disposable mask, a surgical mask, an N95 respirator, a KN95 respirator, and a gaiter.

* * * * *